United States Patent [19]

Fuhr et al.

[11] Patent Number: 5,157,065

[45] Date of Patent: * Oct. 20, 1992

[54] THERMOPLASTIC POLYCARBONATE MOULDING COMPOSITIONS WITH FLAME-RESISTANT PROPERTIES

[75] Inventors: Karl Fuhr, Krefeld; Friedemann Müller, Neuss; Karl-Heinz Ott, Leverkusen, all of Fed. Rep. of Germany

[73] Assignee: Bayer Aktiengesellschaft, Leverkusen, Fed. Rep. of Germany

[ * ] Notice: The portion of the term of this patent subsequent to Jan. 29, 2008 has been disclaimed.

[21] Appl. No.: 717,246

[22] Filed: Jun. 17, 1991

[30] Foreign Application Priority Data

Jun. 22, 1990 [DE] Fed. Rep. of Germany ....... 4019903
Aug. 28, 1990 [DE] Fed. Rep. of Germany ....... 4027104

[51] Int. Cl.$^5$ .............................................. C08K 5/523
[52] U.S. Cl. ..................... 524/141; 525/67; 525/69; 525/104
[58] Field of Search ............ 524/141; 528/29; 525/69, 67, 104

[56] References Cited

U.S. PATENT DOCUMENTS

| | | | |
|---|---|---|---|
| 4,683,255 | 7/1987 | Sugio et al. | 524/151 |
| 4,751,260 | 6/1988 | Kress et al. | 525/69 |
| 4,766,165 | 8/1988 | Kress et al. | 525/69 |
| 4,988,748 | 1/1991 | Fuhr et al. | 524/141 |

*Primary Examiner*—Veronica P. Hoke
*Attorney, Agent, or Firm*—Joseph C. Gil; Aron Preis

[57] ABSTRACT

Thermoplastic molding compositions containing thermoplastic, aromatic polycarbonates, graft polymers, special phosphorus compounds, antidripping agents and optionally other thermoplasts as well as conventional additives are disclosed. The compositions are characterized by their flame resistance and mechanical properties. Also disclosed is a process for the preparation of the molding compositions.

12 Claims, No Drawings

THERMOPLASTIC POLYCARBONATE MOULDING COMPOSITIONS WITH FLAME-RESISTANT PROPERTIES

This invention relates to thermoplastic moulding compositions consisting of

A) from 40-90 parts by weight, preferably from 50-70 parts by weight, of a thermoplastic aromatic polycarbonate, B) from 1-25 parts by weight, preferably from 5-20 parts by weight, of a graft polymer prepared from B.1) 5-70 parts by weight, preferably 15-60 parts by weight of a mixture of:

B.1.1) 50-95% by weight of styrene, α-methylstyrene, halogenated styrene, styrene alkylated in the nucleus, methyl methacrylate or mixtures thereof and B.1.2) 5-50% by weight of (meth)acrylonitrile, methylmethacrylate, maleic acid anhydride, N-substituted maleimide or mixtures thereof on B.2) from 30-95 parts by weight, preferably from 40-85 parts by weight, of a rubber having a glass temperature $TG \leq 10°$ C. consisting e.g. of polybutadiene, alkylacrylate, EPDM (ethylene-propylenediene monomer) or silicone rubbers, C) from 1-25 parts by weight, preferably from 2-20 parts by weight, based on 100 parts by weight of the total weight of A) and B), of a phosphorus compound, D) from 0.05-10 parts by weight, based on 100 parts by weight of the total weight of A) and B), of anti-dripping agent consisting of D.1) from 0.05-5 parts by weight, preferably from 0.1-1.0 parts by weight, based on 100 parts by weight of A) and B), of a tetrafluoroethylene polymer having an average particle size of from 0.05-20 μm and a density of from 1.2 to 1.9 g/cm³, a coagulated mixture of emulsions of the tetrafluoroethylene polymer D.1) with emulsions of graft polymer B)being preferably used and the ratio by weight of graft polymer B) to tetrafluoroethylene polymer D.1) being from 95:5 to 60:40 and the amount of coprecipitate of B) and D.1), based on 100 parts by weight of A) and B), being from 0.1-20.0 parts by weight, and/or D.2) from 0.1-10 parts by weight, preferably from 0.2 to 3.0 parts by weight, based on 100 parts by weight of A) and B), of a silicone resin corresponding to the overall formula (VI)

$$R_xSi(OR')_yO_{\frac{4-x-y}{2}} \qquad (VI)$$

wherein

R denotes a monovalent hydrocarbon group which may be substituted, in particular a methyl and/or phenyl group, R' denotes an alkyl group or a hydrogen, x has a value from 0.75 to 1.75 and y has a value from 0.0001 to 0.5, the silicone resin being built up of units of the formula $SiO_{4/2}$, $RSiO_{3/2}$, $R_2SiO_{2/2}$ and/or $R_3SiO_{1/2}$, a coagulated mixture of emulsions of the silicone resin D.2) and optionally also an emulsion of a solution thereof, e.g. in toluene, with emulsions of graft polymer B) being preferably used, in which the ratio by weight of graft polymer B) to silicone resin D.2) is from 99.9:0.1 to 50:50% by weight and the amount of coprecipitate of B) and D.2), based on 100 parts by weight of A) and B), is from 0.1 to 30.0 parts by weight, characterised in that the phosphorus compounds C) contained therein correspond to formula (I)

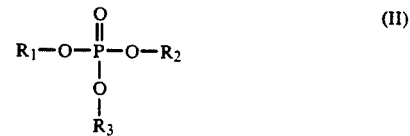

wherein

R denotes a direct bond or a

$x$ has the value 0, 1 or 2 when $y$ has the value 1 or $x$ has the value 2 when $y$ has the value 2, and the aromatic groups may also be alkyl substituted.

Polycarbonate moulding compositions containing phosphate esters corresponding to formula (II)

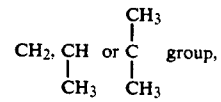

wherein $R_1$, $R_2$ and $R_3$ are identical or different and denote $C_1-C_{20}$ hydrocarbon groups and at least two of the groups denoted by $R_1$, $R_2$ and $R_3$ are substituted or unsubstituted aryl groups are known substances (see DE-OS 3 429 481 (Le A 23 063) and DE-OS 3 430 234 (Le A 22 925) but compounds of the formula (I) do not occur therein.

Polycarbonate moulding compositions containing phosphorus compounds corresponding to formula (III)

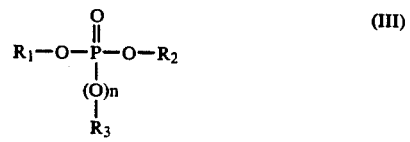

wherein $R_1$, $R_2$ and $R_3$ denote, independently of one another, an optionally halogenated $C_1-C_8$-alkyl or an optionally halogenated $C_6-C_{20}$-aryl and n stands for 0 or 1 are also known (see EP-OS 0 174 493 (Le A 23 043-EP), DE-OS 3 444 869 (Le A 23 527), DE-OS 3 444 868 (Le A 23 502), DE-OS 3 516 807 (Le A 23 790) DE-OS 3 521 888 (Le A 23 877), DE-OS 3 523 316 (Le A 23 927), DE-OS 3 523 314 (Le A 23 940), DE-OS 3 545 609 (Le A 24 039), DE-OS 3 615 768 (Le A 24 500), DE-OS 3 617 511 (Le A 24 501), DE-OS 3 628 904 (Le A 24 683) and DE-OS 3 629 546 (Le A 24 695)). The compounds of formula (I) again are not mentioned in these specifications.

One of the main disadvantages of these moulding compositions containing phosphates corresponding to formulae (II) and (III) is that the phosphoric acid esters described in the above literature references are in part volatile under the conditions of preparation and processing. An increase in molecular weight of the phosphates by lengthening the alkyl chains on the aromatic groups generally has hardly any effect on the volatility but reduces the flame-resistant effect of the phosphates since it reduces the phosphorus content. To re-establish the flame-resistant properties it is therefore necessary to use larger quantities of phosphorus additives which, however, have the undesirable effect of, for example, lowering the Vicat temperature.

It is also known to use polyphosphates for rendering polycarbonate moulding compounds flame-resistant (see U.S. Pat. Nos. 4,463,130 (Le A 21 835) and 4,481,338 (Le A 21 841)).

Such moulding compounds have, however, the disadvantage that owing to their polymeric phosphate content they do not have the high degree of flowability required.

Phosphates of 4-phenylphenol have hitherto been described as flame-retardants only for PPO resin compounds which in any case have a relatively high inherent flame resistance and may contain polystyrene resins (see U.S. Pat. No. 4,683,255).

The polycarbonate moulding compounds with flame-resistant properties disclosed in DE-OS 3 824 356 corresponding to U.S. Pat. No. 4,988,748 differ from the polycarbonate moulding compounds according to the present invention inter alia in that they contain, in addition, thermoplastic copolymers in quantities of from 10 to 50 parts by weight, based on 100 parts by weight of polycarbonate, graft polymer and copolymer.

It has surprisingly been found that when the phosphoric acid esters of formula (I) are used in thermoplastic moulding compounds which contain no thermoplastic copolymers such as SAN, not only are advantageous properties obtained (impact strength, surface characteristics, flame resistance) but the notched impact strength is also improved and the tendency to evaporation of the phosphoric acid esters during processing of the moulding compounds and migration during storage, especially in the heat, are significantly suppressed.

Due to the method employed for their preparation, the graft polymers used according to the invention contain not only chemically bound SAN polymer but also SAN polymer which is not chemically bound. This quantity of free SAN polymer is considered to be less than 50% by weight, based on the total quantity of monomers B.1) in B). This polymer, however, remains in the vicinity of the graft polymer during compounding and is not distributed in the entire moulding compound as is a SAN polymer used as granulate. In the present case, this quantity amounts to at most 8.75 parts by weight, based on 100 parts by weight of components A) +B).

The polycarbonates suitable for use as component A) according to the invention may be either homopolycarbonates or copolycarbonates of the diphenols of formula (IV)

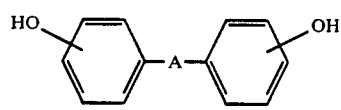

In addition, the polycarbonates used as component A) may in particular consist of copolycarbonates of the diphenols (IV) and (IVa)

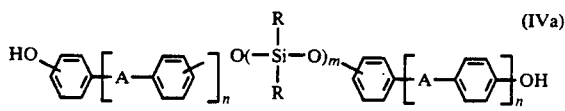

wherein
A denotes a single bond, $C_1$-$C_5$-alkylene, a $C_2$-$C_5$-alkylidene or a $C_5$-$C_6$-cycloalkylidene which may be substituted by methyl groups, or it may denote O, S, or $SO_2$ and the aromatic regions may be substituted by methyl groups or halogen atoms; n=1 or 0, the R's may be identical or different and denote a linear $C_1$-$C_{20}$-alkyl, a branched $C_3$-$C_{20}$-alkyl or a $C_6$-$C_{20}$-aryl group, preferably $CH_3$, and m stands for a number from 5 to 100, preferably from 20 to 80, and the ratio by weight of diphenols of formula (IVa) in the copolycarbonates is calculated to provide from 1 to 25% by weight, preferably from 2.5 to 25% by weight of diorganosiloxy units (V)

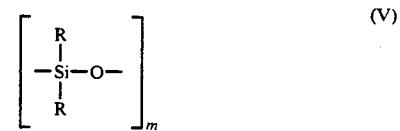

in polycarbonate A).

The polycarbonates used as component A) may be either linear or branched and they may contain aromatically bound halogen, preferably bromine and/or chlorine, but they may be free from aromatically bound halogen, in other words halogen free.

The polycarbonates used as component A) may be used either singly or as a mixture. When the components A) consist of a mixture of siloxane-containing polycarbonates and polycarbonates which are free from siloxane, the siloxane-containing polycarbonates may contain more than 25% by weight of diorganosiloxy units, provided that together with these siloxane-free polycarbonates the overall diorganosiloxane content in the mixture is still 1 to 25% by weight.

The diphenols corresponding to formula (IV) are either known from the literature or the subject of German Patent Application P 3 842 931.4 (Le A 26 318) or they may be prepared by methods known from the literature. Polydiorganosiloxanes containing hydroxyaryloxy end groups as in formula (IVa) are also known (see e.g. U.S. Pat. No. 3,419,634) or may be prepared by methods known from the literature.

The preparation of polycarbonates suitable for use as component A) according to the invention is known from the literature or the subject of German Patent Application P 3 842 931.4 (Le A 26 318) or may be carried out e.g. with phosgene by the interfacial process or with phosgene by the homogeneous phase process (the so-called pyridine process), in which the molecular weight required may be obtained in known manner by using a suitable quantity of known chain terminators. The preparation of polycarbonates containing polydiorganosiloxane units has been described, e.g. in DE-OS 3 334 782.

Examples of suitable chain terminators include phenol and p-tert.-butylphenol as well as long chained alkylphenols such as 4-(1,3-tetramethyl-butyl)phenol according to DE-OS 2 842 005 and monoalkylphenols and dialkylphenols having a total of 8 to 20 carbon atoms in the alkyl substituents according to German Offenlegungsschrift No. 3 506 472, e.g. p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The quantity of chain terminators to be used is generally from 0.5 to 10 mol-%, based on the sum of the diphenols (IV) and (IVa) put into the process.

Polycarbonates suitable for use as component A) according to the invention may be branched in known manner, preferably by the incorporation of from 0.05 to 2.0 mol-%, based on the sum of diphenols, of trifunctional or higher than trifunctional compounds, e.g. compounds having three or more than three phenolic OH groups.

These compounds have average molecular weights measured as weight average molecular weight ($M_w$, determined e.g. by ultracentrifugation or scattered light measurement) of from 10,000 to 200,000, preferably from 20,000 to 80,000.

The following are examples of suitable diphenols corresponding to formula (IV): Hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane and 1,1-bis-(4-hydroxyphenyl)-3,3,5-trimethylcyclohexane.

2,2-Bis-(4-hydroxyphenyl)-propane and 1,1-bis-(4-hydroxyphenyl)-cyclohexane are preferred diphenols of formula (IV). Mixtures of diphenols may be used also.

Suitable diphenols corresponding to formula (IVa) are those in which R stands for methyl, ethyl, propyl, n-butyl, tert.-butyl or phenyl. Mixtures of diphenols of formula (IVa) may also be used.

Preferred diphenols of formula (IVa) are those corresponding to formula (IVb)

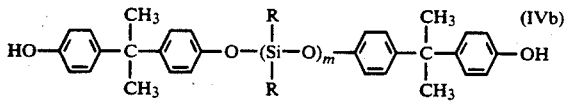

wherein
the R's are identical and have the meanings indicated above, i.e. methyl, etc. and phenyl, and m again stands for an integer from 5 to 100, preferably from 20 to 80.

Polycarbonates of diphenols of formula (IV) and diphenols of formula (IVb) are preferred polydiorganosiloxane-polycarbonate block copolymers.

Rubbers suitable for the preparation of the graft polymers used as component B) are, in particular, polybutadienes, polychloroprenes, polyisoprenes, styrene-/butadiene copolymer rubbers, acrylonitrile/butadiene copolymer rubbers having gel contents (determined at 20° C.) greater than 30% by weight, acrylate rubbers, EPDM (ethylene-propylene-diene monomer) rubbers and silicone rubbers. Suitable butadiene/styrene copolymer rubbers may contain up to 30% by weight, based on the weight of rubber, of a lower alkylester of acrylic or methacrylic acid (for example, methyl methacrylate, ethyl acrylate or methyl acrylate).

Suitable alkyl acrylate rubbers are those based on $C_1$–$C_8$-alkyl acrylates, in particular ethyl, butyl and ethylhexyl acrylate. These alkyl acrylate rubbers may contain up to 30% by weight, based on the weight of the rubber, of monomers such as vinyl acetate, acrylonitrile, styrene, styrene alkylated in the nucleus, halogenated styrene, methyl methacrylate and/or vinyl ethers incorporated by copolymerisation. These alkyl acrylate rubbers may also contain minor quantities, preferably up to 5% by weight, based on the weight of rubber, of ethylenically unsaturated monomers which have a cross-linking action such as, for example, alkylene diol (meth)acrylates, polyester di(meth)acrylates, divinylbenzene, trivinylbenzene, triallyl cyanurate, allyl (meth)acrylate, butadiene and isoprene. Alkyl acrylates of this type are known. Acrylate rubbers used as graft basis may also be products containing, as nucleus, a cross-linked diene rubber of one or more conjugated dienes such as polybutadiene or a copolymer of a conjugated diene with an ethylenically unsaturated monomer such as styrene and/or acrylonitrile.

Silicone rubbers suitable for the purpose of this invention contain, in a dispersed form, at least partially cross-linked, particulate silicone rubbers having groups corresponding to the following general formulae mainly incorporated chemically:

a) $R_2SiO_{2/2}$, $RSiO_{3/2}$, $R_2R^3SiO_{\frac{1}{2}}$, $SiO_{4/2}$ and optionally groups of the formula
b) $R^1CH=CH-(R^2)$ optionally in combination with SH groups, in which formulae,
R = a monovalent, saturated hydrocarbon group, in particular $CH_3$ or $C_6H_5$ optionally substituted by SH, halogen or $C_1$–$C_6$-alkoxy,
$R^1$ = H or $C_1$–$C_6$-alkyl, in particular H or $CH_3$,
$R^2$ = a single bond or $C_1$–$C_4$-alkylene, in particular $CH_2$ or $C_2H_4$, and
$R^3$ = R or OH.

The quantities of the individual siloxane units are calculated to provide from 0 to 0.5 molar units of $R_2R^3SiO_{\frac{1}{2}}$, from 0 to 10 mol per unit of $RSiO_{3/2}$ and from 0 to 3 molar units of $SiO_{4/2}$ per 100 molar units of the formula $R_2SiO_{2/2}$. In preferred silicone rubbers, at least 80% of all the groups denoted by R are $CH_3$ groups.

When the siloxane group has the formula $R_2R^3SiO_{\frac{1}{2}}$, one of the three groups denoted by R may be a hydroxyl group. The dimethylhydroxysiloxy unit is a particularly preferred end group.

The silicone rubbers contain the groups b) in quantities of from 2 to 10 mol-%, based on the total of all the groups R.

Diene rubbers, alkyl acrylate rubbers and silicone rubbers are preferred rubbers for the preparation of the graft polymers B).

The rubbers are present in the graft polymers B) in the form of at least partially cross-linked particles having an average particle size of from 0.1 to 3.0 μm, in particular from 0.2 to 0.6 μm. They are at least partially cross-linked, i.e. they have gel contents above 20% by weight, in particular above 50% by weight, most preferably from 73 to 98% by weight.

The graft polymers B) are prepared by radical graft copolymerisation of the monomer mixtures of B.1.1) and B.1.2) defined above in the presence of the rubbers B.2) which are to be grafted, and they are all known products. Emulsion, solution, solvent-free and suspension polymerisation are preferred methods of preparation of the graft polymers B). Particularly preferred graft polymers B) are the so-called ABS polymers.

The phosphorus compounds suitable for use as component C) according to the invention may generally be prepared by known processes (see, for example, Ullmann, Enzyklopädie der technischen Chemie, Volume 18, pages 301 et seq, 1979; Houben-Weyl, Methoden der Organischen Chemie, Volume 12/1, page 43; Beilstein, Volume 6, page 177).

The aromatic parts of the phosphorus compounds according to the invention may be substituted with alkyl groups in which the carbon chain may contain up to about 4 carbon atoms.

The following are examples of phosphorus compounds of formula I suitable for use as component C) according to the invention: Phosphoric acid-bisphenyl-(4-phenylphenyl)-ester, phosphoric acid phenyl-bis-(4-phenylphenyl)-ester, phosphoric acid-tris-(4-phenylphenyl)-ester, phosphoric acid-bis-phenyl-benzylphenyl-ester, phosphoric acid-phenyl-bis-(benzylphenyl-ester, phosphoric acidphenyl-bis-((1-phenylethyl)-phenyl)-ester, phosphoric acid-bis-phenyl-((1-methyl-1-phenylethyl)-phenyl)-ester, phosphoric acid-phenyl-bis-((1-methyl-1-phenylethyl)-phenyl-ester, phosphoric acid-tris-((1-methyl-1-phenylethyl)-phenyl)-ester, phosphoric acid-phenyl-bis-(4-(1-phenylethyl)-2,6-dimethyl-phenyl)-ester, phosphoric acid-2,4-di-benzylphenyl-bis-phenyl-ester, phosphoric acid-2,4-di-(1-phenylethyl)-phenyl-bis-phenyl-ester and phosphoric acid-2,4-di-(1-methyl-1-phenylethyl)-phenyl-bis-phenyl-ester.

The following are particularly preferred: phosphoric acid-bis-phenyl-((1-methyl-1-phenylethyl)-phenyl)-ester, phosphoric acid-phenyl-bis-(4-phenylphenyl)ester, phosphoric acid-phenyl-bis-((1-phenylethyl)-phenyl)-ester, phosphoric acid-phenyl-bis-((1-methyl-1-phenylethyl)-phenyl)-ester, phosphoric acid-phenyl-bis-(benzylphenyl)-ester, phosphoric acid-tris-((1-methyl-1-phenylethyl)-phenyl)-ester, phosphoric acid-2,4-di-(1-phenylethyl)-phenyl-bis-phenylester and phosphoric acid-2,4-di-(1-methyl-1-phenylethyl)-phenyl-bis-phenyl-ester. The phosphoric acid esters according to the invention are also used as mixtures with one another and with polyphosphoric acid esters of Novolaks (U.S. Pat. No. 4,105,825).

The tetrafluoroethylene polymers suitable for use as component D.1) according to the invention are polymers having fluorine contents of from 65–76% by weight, preferably from 70–76% by weight. The following, inter alia, are examples: polytetrafluoroethylene, tetrafluoroethylene-hexafluoropropylene copolymers and tetrafluoroethylene copolymers containing small quantities of fluorine-free copolymerisable ethylenically unsaturated monomers. Polymers of this type are known and may be prepared by known processes, for example by the polymerisation of tetrafluoroethylene in an aqueous medium with the aid of a catalyst which forms free radicals, such as sodium, potassium or ammonium peroxydisulphate, at pressures from 7 to 71 kg/cm² and at temperatures from 0° to 200° C., preferably at temperatures from 20° to 100° C. (for further details see, for example, U.S. Pat. No. 2,393,967).

The silicone resins D.2) suitable for the present invention correspond to the overall formula (VI):

wherein
R stands for a monovalent hydrocarbon group which may be substituted, in particular a methyl group and/or a phenyl group, R' denotes an alkyl group or hydrogen, x has a value from 0.75 to 1.75 and y has a value from 0.0001 to 0.5, and the silicone resin is built up of units of the formula $SiO_{4/2}$, $RSiO_{3/2}$, $R_2SiO_{2/2}$ and/or $R_3SiO_{\frac{1}{2}}$.

Preferred silicone rubbers D.2) of formula (VI) are those in which at least 80% by weight of all the groups denoted by R are methyl and phenyl groups.

Further details concerning the silicone resins D.2) are given in German Offenlegungsschrift 3 815 124 (Le A 25 925).

The addition of tetrafluoroethylene polymers or silicone resins in particular reduces or completely prevents dripping of the molten moulding compound in the event of fire.

When the moulding compositions according to the invention are prepared from components A), B), C) and a polytetrafluoroethylene powder D.1) and/or a silicone resin D.2) by, for example, melt compounding in kneaders or extruders, the moulding compounds obtained have a high flame-resistance but the moulded products produced therefrom sometimes have unsatisfactory surface characteristics, such as micro cracks or streaks.

This may be safely prevented by using very finely divided, unsintered tetrafluoroethylene polymers D.1) in the form of a coagulated mixture of emulsions of the tetrafluoroethylene polymers and/or emulsions of the silicone resins D.2) with emulsions of the graft polymers B).

To prepare a suitable mixture containing tetrafluoroethylene polymer D.1), an aqueous emulsion (latex) of a graft polymer B) having average latex particle sizes of from 0.05 to 30.0 μm, in particular from 0.02 to 5.0 μm, most preferably from 0.2 to 0.6 μm, is first mixed with a finely divided emulsion in water of a tetrafluoroethylene D.1) having an average particle size of from 0.05 to 20 μm, in particular from 0.08 to 10 μm. Suitable tetrafluoroethylene polymer emulsions normally have solids contents of from 30 to 70% by weight, in particular from 50 to 60% by weight. The emulsions of graft polymers B) to be used have solids contents of from 20 to 60% by weight, in particular from 30 to 45% by weight.

The ratio by weight of graft polymer B) to tetrafluoroethylene polymer D.1) in the emulsion mixture is from 95:5 to 60:40.

The emulsion mixture is then coagulated in known manner, for example by spray drying, freeze drying or coagulation by the addition of inorganic or organic salts, acids or bases or organic, water-miscible solvents such as alcohols or ketones, preferably at temperatures from 20° to 150° C., in particular from 50° to 100° C. If necessary, the product may be dried at 50° to 200° C., preferably at 70° to 100° C.

Commercial products such as Teflon(®) 30N of DuPont are suitable tetrafluoroethylene polymer emulsions.

The preparation of the pulverulent polymer mixtures of silicone resin D.2) and graft polymer B) according to German Offenlegungsschrift 3 815 124 (Le A 25 925) is carried out as follows:

I. A dispersion of an organic, thermoplastic polymer B) having an average particle diameter ($d_{50}$) of from 0.05 to 30.0 μm, preferably from 0.05 to 5.0 μm, most preferably from 0.02 to 0.6 μm, and a solids content of from 20 to 60% by weight, based on the weight of the dispersion of component B), is mixed so intimately and in such proportions with an emulsion of a silicone resin D.2) of formula (VI) having an average particle diameter ($d_{50}$) of from 0.05 to 3 μm, preferably from 0.1 to 1 μm, and a solids content of up to 60% by weight, preferably from 30 to 50% by weight, based on the weight of the emulsion of component D.2), that virtually no agglomeration of the particles takes place and that the resulting mixtures contain from 0.1 to 50% by weight, preferably from 5 to 40% by weight and in particular from 8 to 20% by weight, of the silicone resin D.2) and from 99.9 to 50% by weight, preferably from 95 to 60% by weight, most preferably from 92 to 80% by weight of the thermoplatic polymer B), based on the total amount of silicone resin D.2) and thermoplastic polymer B), II. the mixture thus obtained is coagulated in known manner at 20° to 120° C. and at pH values from 7 to 2, preferably from 5 to 3, to form a finely divided mixture of components B) and D.2) and III. after isolation of this coagulate, the latter is dried in known manner at temperatures from 50° to 150° C., in particular from 80° to 120° C.

Since the graft polymers B) to be used according to the invention may be introduced by premixing their emulsions with emulsions of component D), component B) is most suitably prepared by the process of emulsion polymerisation. The ratio of polytetrafluoroethylene D.1) to graft polymer B) should be chosen so that the total amount of D.1) in the mixture of A), B), C) and D) will be from 0.05 to 5.0 parts by weight, preferably from 0.1 to 1.0 parts by weight. The ratio of silicone resin D.2) to graft polymer B) should be chosen so that the total amount of silicone resin D.2) in the mixture of A), B), C) and D) will be from 0.1 to 10.0 parts by weight, preferably from 0.2 to 3.0 parts by weight.

The thermoplastic moulding compositions according to the invention may also contain other thermoplasts, such as polysulphones, polyether sulphones, polyketones, polyether ketones, polyphenylene ethers, polyarylene sulphides and additives such as stabilizers, pigments, fluidizing agents, mould release agents, antistatic agents and/or other flame retardants such as metal compounds or halogen compounds.

The present invention thus also relates to polycarbonate moulding compositions consisting of components A), B), C) and D) and optionally thermoplastic polysulphones, thermoplastic polyether sulphones, thermoplastic polyketones, thermoplastic polyether ketones, thermoplastic polyphenylene ethers, thermoplastic polyarylene sulphides, stabilizers, pigments, fluidising agents, mould release agents, antistatic agents and/or other flame retardants.

The thermoplastic moulding compounds according to the invention, consisting of components A), B), C) and D) and optionally thermoplastic polysulphones, thermoplastic polyether sulphones, thermoplastic polyketones, thermoplastic polyether ketones, thermoplastic polyphenylene ethers, thermoplastic polyarylene sulphides, stabilizers, pigments, fluidizing agents, mould release agents, antistatic agents and/or other flame retardants are prepared by mixing the components in known manner and melt compounding or melt extruding the mixture in conventional apparatus such as internal kneaders, extruders or double shaft screws at temperatures from 200° to 330° C. or by mixing the solutions of the above-mentioned components in suitable organic solvents, e.g. in chlorobenzene, and concentrating the solution mixtures by evaporation in conventional apparatus, for example in evaporation extruders.

Mixing of the individual components may be carried out in known manner, either successively or simultaneously, either at about 20° C. (room temperature) or at elevated temperatures.

The present invention thus also relates to a process for the preparation of thermoplastic polycarbonate moulding compositions consisting of components A), B), C) and D) and optionally polysulphones, polyether sulphones, polyketones, polyether ketones, polyphenylene ethers, polyarylene sulphides, stabilizers, pigments, fluidizing agents, mould release agents, antistatic agents and/or other flame retardants, characterised in that the above-mentioned components are mixed in known manner and then melt compounded or melt extruded in conventional apparatus at temperatures from 200° C. to 330° C. or solutions of the said components in suitable organic solvents are mixed together and the solution mixtures are concentrated by evaporation in conventional apparatus.

The moulding compositions according to the present invention may be used for the production of moulded articles of all types. In particular, they may be used for the production of moulded articles by injection moulding. The following are examples of the moulded articles which may be produced: Housing parts of all types (e.g. for domestic appliances and office machinery), cover plates for the building industry and parts for the motor vehicle industry. The compounds are also used in the field of electrotechnology on account of their excellent electrical properties.

The moulding compounds may also be worked up to produce moulded articles by deep drawing or hot moulding of plates or sheets previously produced by extrusion.

The particle sizes indicated are always average particle diameters $d_{50}$ determined by ultracentrifuge measurements according to W. Scholtan et al, KolloidZ. u. Z. Polymere 250 (1972) 782–796.

EXAMPLES

Materials Used

I. Aromatic polycarbonate of 10% by weight of tetrabromo-bisphenol A and 90% by weight of bisphenol A having a relative viscosity of 1.284 (0.5% by weight solution) determined in methylene chloride at 25° C.

II. Aromatic polycarbonate of 100% by weight of bisphenol A having a relative viscosity of 1.284 (0.5% by weight solution) determined in methylene chloride at 25° C.

III. Aromatic oligomeric carbonate of 100% by weight of tetrabromo-bisphenol A, BC-52-HP of Great Lakes Chem. Corp. USA.
IV. Thermoplastic polymer of styrene and acrylonitrile having an acrylonitrile content of 29% by weight and an average molecular weight of 60,000.
V. ABS graft polymer of 50% by weight of a styrene-acrylonitrile mixture (in a ratio of 72:28) on 50% by weight of a particulate polybutadiene having an average particle diameter ($d_{50}$) of 0.4 μm, obtained by emulsion polymerisation.
VI. A polymer according to V containing 10% by weight of polytetrafluoroethylene and prepared by mixing the ABS graft polymer as latex and polytetrafluoroethylene as dispersion, coagulating the resulting mixture and working it up together as coprecipitate.
VII. Polymer according to V containing 10% by weight of silicone resin and prepared by coagulating the graft polymer as latex and the silicone resin as emulsion, coagulating the mixture and working it up as a coprecipitate.
VIII. Triphenylphosphate
IX. Phosphoric acid-phenyl-bis-((1-phenylethyl)-phenyl)-ester according to Example 1 of German Offenlegungsschrift No. 3 824 356 (Le A 26 015).
X. Phosphoric acid-2,4-di-(1-phenylethyl)-phenyl-bis-phenyl ester according to Example 1 of German Patent Application P 3 940 927 (Le A 27 145).
XI. Mixed phosphoric acid ester according to Example 2 of German Patent Application P 3 940 927 (Le A 27 145).

EXAMPLE 1 OF GERMAN PATENT APPLICATION P 39 40 927

Preparation of phosphoric acid 2,4-di-(1-phenylethyl)-phenyl-bis-phenyl ester

To prepare 2,4-di-(1-phenylethyl)-phenol, 1129.4 g phenol (12 mol) and 11.3 g concentrated sulfuric acid (after melting of the phenol) are introduced into and heated to 100° C. in a 6 liter flask equipped with a stirrer, thermometer, dropping funnel, reflux condenser and nitrogen inlet pipe and heated by a mushroom heating hood with temperature control. 2749.6 g styrene (24 mol with a 10% excess) are added dropwise over a period of 8 hours, the temperature rising to 125° C. The reaction mixture is left to react for 1 hour at that temperature and then for 5 hours at 150° C. After cooling to approximately 80° C., 4.8 g magnesium oxide are added and reacted in 1 hour to neutralize the sulfuric acid.

The main product is separated from first runnings and residue by vacuum distillation in a Vigreux column.

The first runnings are removed under a pressure of 3 mbar and at a sump temperature rising to 200° C. and at a maximum boiling temperature of 150° C. The yield comprises 312.1 g. The product is predominantly 1-phenylethyl phenol (OH value 270; $n^{20}_D$ 1.5936).

Distillation of the 2,4-di-(1-phenylethyl)-phenol is carried out under a pressure of 3 mbar and at a sump temperature of 210° to 250° C. The boiling temperature is in the range from 170° to 240° C. 3169.2 g product are obtained (OH value 174, theoretical 185; $n^{20}_D$ 1.6039). The yield comprises 87.3%, based on the phenol used.

In addition to the inorganic constituents, the distillation residue (218.5 g) contains 2,4,6-tri-(1-phenylethyl)-phenol. The residue was discarded.

To prepare phosphoric acid-2,4-di-(1-phenylethyl)-phenyl-bis-phenyl ester, 1934.8 g 2,4-di-(1-phenylethyl)-phenol (6 mol, OH value 174), 1957.8 g triphenyl phosphate (6 mol) and 10.1 g sodium phenolate (0.09 mol) are heated to 150° C. in a 6 liter flask provided with a capillary, a Vigreux column with a descending condenser and a thermometer and heated by a mushroom heating hood with temperature controller. The pressure is then slowly reduced to 300 mbar and the mixture heated to 200° C. A stream of nitrogen flowing in through the capillary mixes the contents of the flask. After approximately 1 hour, the pressure is further reduced to 4 mbar at 200° C., most of the phenol eliminated being distilled off over a period of about 4 hours. The reaction mixture is then heated for another 3 hours at a temperature rising to approximately 250° C. and under a pressure falling to 5 mbar.

554.4 g crystallized product having an OH value of 589 are obtained as the distillate. It contains 547.7 g phenol (6 mol phenol: 567.7 g).

The residue is taken up in methylene chloride in the flask and washed repeatedly with water. The methylene chloride solution is then dried and concentrated. The resin-like residue comprises 3089.9 g which corresponds to a yield of 96.3%. The OH value is 0 and the phosphorus content 5.5% (theoretical 5.8%). The product is predominantly present as phosphoric acid 2,4-di-(2-phenylethyl)-phenyl-bis-phenyl ester.

Instead of 2,4-di-(1-phenylethyl)-phenol, it is also possible for example to use 2,4-dibenzyl phenyl and 2,4-di-(1-methyl-1-phenylethyl)-phenol.

Dynamic TGA measurements (heating rate 10° C./minute) showed that the total volatile component of the above phosphate according to the invention at 290° C. comprises approx. 6% by weight compared with triphenyl phosphate with a weight loss of 100%.

EXAMPLE 2 OF GERMAN PATENT APPLICATION P 39 40 927

Preparation of a mixture of phosphoric acid 2,4-di-(1-phenylethyl)-phenyl-bis-phenyl ester and phosphoric acid phenyl-bis-[(1-phenylethyl)-phenyl]-ester.

To prepare 2,4-di-(1-phenylethyl)-phenol and (1-phenylethyl)-phenol, 2823.4 g phenol (30 mol) and 100.0 g acidic ion exchanger (Lewatit SPC 108, a product of Bayer AG, swollen in the reaction mixture of a batch prepared beforehand) are introduced into and heated to 55° C. in a 6 liter flask equipped with a stirrer, thermometer, dropping funnel, reflux condenser and nitrogen inlet pipe and heated by a mushroom heating hood with temperature control. 2083.0 g styrene (20 mol) are added dropwise over a period of 5 hours, the temperature rising to 85° C. The reaction mixture is then left to react for 1 hour at that temperature and then for 2.5 hours at 70° C. The ion exchanger is then filtered off.

The excess phenol is removed by vacuum distillation in a Vigreux column. Under a pressure of 3 mbar and at a sump temperature rising to 200° C., 1273.0 g phenol (13.5 mol) distill over at a maximum boiling temperature of 160° C. The residue (3552.4 g, OH value 255) is the product intended for conversion into the phosphoric acid ester. Vacuum distillation in accordance with Example 1 shows that it consists of 2723.5 g (1-phenylethyl)-phenol (13.7 mol, OH value 280, theoretical 283), 772.7 g 2,4-di-(1-phenylethyl)-phenol (2.6 mol, OH value 184, theoretical 186) and 47.6 g 2,4,6-tri-(1-phenylethyl)-phenol (0.1 mol, OH value 146, theoretical 138).

To prepare the phosphoric acid ester from the above phenol mixture, 2589.7 g phenol mixture (1988.0 g (10.0 mol) (1-phenylethyl)-, 573.9 g (1.9 mol) 2,4-di-(1-phenylethyl)- and 29.7 g (0.07 mol) 2,4,6-tri-(1-phenylethyl)-phenol), 2284.1 g triphenyl phosphate (7 mol) and 20.0 g magnesium chloride (0.2 mol) are heated to 150° C. in a 6 liter flask equipped with a capillary, Vigreux column with distillation bridge and a thermometer and heated by a mushroom heating hood with temperature control. The pressure is then slowly reduced to 300 mbar and the reaction mixture heated to 200° C. A stream of nitrogen flowing in through the capillary mixes the contents of the flask. After about 1 hour, the pressure is further reduced to 4 mbar at 200° C. and most of the phenol eliminated is distilled off over a period of about 6 hours. The reaction mixture is then heated for another 2 hours at a temperature rising to approximately 250° C. and under a pressure falling to 3 mbar.

1112.8 g crystallized product having an OH value of 582 are obtained as the distillate. It contains 1086.3 g phenol (12.0 mol phenol: 1129.4 g).

The residue in the flask is taken up in methylene chloride and washed repeatedly with water. The methylene chloride solution is then dried and concentrated. The resin-like residue comprises 3649.4 g, which corresponds to a yield of 97.0%. The OH value is 0 and the phosphorus content 5.4% (theoretical 5.8%). The product is present as the above mixture. In addition, it contains small quantities of phosphoric acid 2,4,6-tri-(1-phenylethyl)-phenyl-bis-phenyl ester and triphenyl phosphate, the latter in a quantity of 2.2% by weight.

Dynamic TGA measurements (heating rate 10° C./minute) showed that the total volatile component of the above phosphate according to the invention at 290° C. comprises approximately 6% by weight compared with triphenyl phosphate with a weight loss of 100%.

Preparation and testing of the moulding compounds:

The required components are mixed in the quantities indicated in Table 1 (in parts by weight) at 230°-240° C. in a Banbury internal kneader (Pomini-Farrel), Model BR (1.2 l) or Model 00C (3 l) and the mixture is worked up into a granulate.

The moulding compounds are extrusion moulded at 260° C. to form test samples (Apparatus: Werner Pfleiderer Screw DKS 275, locking force 275 MP, screw diameter 56 mm, length L/D-23/1) and the test samples are subjected to the following tests:

Impact strength according to DIN 43 543 ($a_n$)

Notched impact strength according to DIN 53 543 ($a_k$)

Dimensional stability under heat according to DIN 53 460 (Vicat B)

Fire test according to the regulations of Underwriter Laboratories (UL 94)

Table 2 shows the test results obtained.

TABLE 2

| | Test results | | | |
|---|---|---|---|---|
| | $a_n$ kJ/m² | $a_k$ kJ/m² | Vicat B °C. | UL 94 1.6 mm rod |
| Comparison 1 | n.b.* | 17 | 101 | V-O |
| Comparison 2 | n.b. | 11 | 86 | V-O |
| Comparison 3 | n.b. | 12 | 98 | V-O |
| Comparison 4 | n.b. | 5 | 87 | V-O |
| Comparison 5 | n.b. | 18 | 89 | V-O |
| Comparison 6 | n.b. | 24 | 86 | V-O |
| Example 1 | n.b. | 20 | 90 | V-O |
| Example 2 | n.b. | 17 | 91 | V-O |
| Example 3 | n.b. | 19 | 89 | V-O |
| Example 4 | n.b. | 20 | 89 | V-O |
| Example 5 | n.b. | 21 | 89 | V-O |
| Example 6 | n.b. | 24 | 90 | V-O |
| Example 7 | n.b. | 23 | 92 | V-O |
| Example 8 | n.b. | 25 | 89 | V-O |
| Example 9 | n.b. | 26 | 99 | V-O |
| Example 10 | n.b. | 24 | 99 | V-O |

*not broken

Tables 1 and 2 show that in the mixtures according to the invention, the difficulty volatile phosphates used in the presence of the usual quantities of polytetrafluoroethylene or silicone resin also impart to the latter a flame resistance conforming to assessment V-O according to UL 94 in a test sample having a thickness of 1.6 mm.

Comparison Examples 1, 2, 5 and 6 represent the state of the art in the presence (Comparisons 1 and 2) and the absence (Comparisons 5 and 6) of a thermoplastic copolymer (SAN), the flame retardant used being triphenylphosphate which is relatively volatile under conditions of compounding. Comparison Examples 3 and 4 also contain a thermoplastic polymer, but the difficulty volatile phosphates of German Patent Application P 39 40 927 (Le A 27 145) are used instead of triphenylphosphate. The notched impact strengths of Comparison Examples 3 and 4 are in the range of from 5 to 12 kJ/m².

Examples 1 to 10 show that in the presence of the difficulty volatile phosphates according to the invention but in the absence of thermoplastic copolymers such as SAN, the notched impact strengths are substantially above 20 kJ/m² and thus higher than in the presence of,

TABLE 1

| | Components used (quantities in % by wt.) | | | | | | | | | | |
|---|---|---|---|---|---|---|---|---|---|---|---|
| Component | I. | II. | III. | IV. | V. | VI. | VII. | VIII. | IX. | X. | XI. |
| Comparison 1 | 65.5 | | | 14.0 | 10.0 | 3.0 | | 7.5 | | | |
| Comparison 2 | | 65.5 | | 14.0 | 4.0 | 4.0 | | 12.5 | | | |
| Comparison 3 | 65.5 | | | 12.5 | 8.0 | 4.0 | - | | | | 10.0 |
| Comparison 4 | | 65.5 | | 10.5 | 4.0 | 4.0 | | | | | 16.0 |
| Comparison 5 | 76.0 | | | | 10.0 | 4.0 | | 10.0 | | | |
| Comparison 6 | | 72.0 | | | 10.0 | 4.0 | | 14.0 | | | |
| Example 1 | 74.0 | | | | 10.0 | 4.0 | | | 12.0 | | |
| Example 2 | 74.0 | | | | 10.0 | 4.0 | | | | 12.0 | |
| Example 3 | 74.0 | | | | 10.0 | 4.0 | | | | | 12.0 |
| Example 4 | 74.0 | | | | 4.0 | | 10.0 | | | | 12.0 |
| Example 5 | | 65.0 | 9.0 | | 10.0 | 4.0 | | | | | 12.0 |
| Example 6 | | 70.0 | | | 10.0 | 4.0 | | | 16.0 | | |
| Example 7 | | 70.0 | | | 10.0 | 4.0 | | | | 16.0 | |
| Example 8 | | 70.0 | | | 10.0 | 4.0 | | | | | 16.0 |
| Example 9 | | 76.0 | | | 8.0 | 4.0 | | | | | 12.0 |
| Example 10 | | 76.0 | | | 5.0 | 2.0 | 5.0 | | | | 12.0 |

What is claimed is:

1. A thermoplastic molding composition comprising
   A) 40-90 parts by weight of a thermoplastic aromatic polycarbonate,
   B) 1-25 parts by weight of a graft polymer prepared from
   B.1) 5-70 parts by weight of a mixture of
   B.1.1) 50-95% by weight of at least one member selected from the group consisting of styrene, α-methylstyrene, halogenated styrene, styrene alkylated in the nucleus and methyl methacrylate, and
   B.1.2) 5-50% by weight of at least one member selected from the group consisting of (meth)acrylonitrile, methyl methacrylate, maleic acid anhydride and N-substituted maleimide on
   B.2) 30-95 parts by weight of a rubber having a glass temperature $TG \leq 10° C.$,
   C) 1-25 parts by weight, based on 100 parts by weight of the total amount of A) and B), of a phosphorus compound,
   D) 0.05-10 parts by weight of an anti-dripping agent selected from the group consisting of
   D.1) 0.05-5 parts by weight, based on 100 parts by weight of the total amount of A) and B) of a tetrafluoroethylene polymer having an average particle size of from 0.05-20 μm and a density of from 1.2-1.9 $g/cm^3$,
   D.2) 0.1-10 parts by weight, based on 100 parts by weight of the total amount of A) and B), of a silicone resin corresponding to

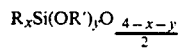

wherein
R is a monovalent hydrocarbon radical,
R' is an alkyl group or hydrogen,
x is 0.75 to 1.75 and
y is 0.0001 to 0.5
wherein silicone resin is built up of units of the formula $SiO_{4/2}$, $RSiO_{3/2}$, $R_2SiO_{2/2}$ and/or $R_3SiO_{\frac{1}{2}}$, and wherein said phosphorus compound corresponds to

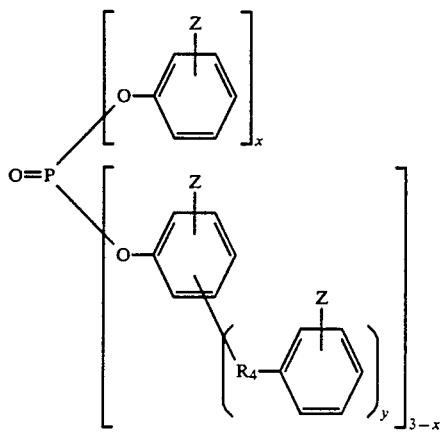

wherein
$R_4$ denotes a direct bond or a

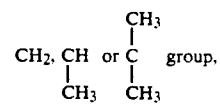

$Z$ independently denote hydrogen atoms or alkyl radicals,
$x$ has the value 0 or 1 when $y$ has the value 1 and
$x$ has the value 2 when $y$ has the value 2.

2. The molding composition of claim 1, characterized in that said component C) is present in an amount of 2 to 20 parts by weight.

3. The molding compositions of claim 1, wherein said component A) is based on diphenols corresponding to formula (IV)

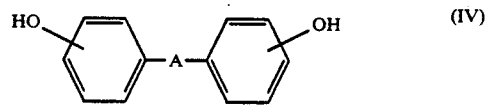

and optionally formula (IVa)

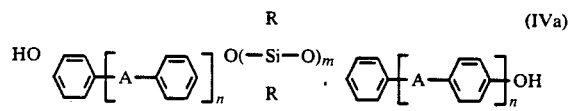

wherein
A is a single bond or a member selected from the group consisting of $C_1$-$C_5$-alkylene, $C_2$-$C_5$-alkylidene, $C_5$-$C_6$-cycloalkylidene which may be substituted by methyl groups, —O—, —S— and $SO_2$.
n is 1 or zero,
m is 5 to 100,
the several R substituents independently of one another denote at least one member selected from the group consisting of a linear $C_1$-$C_{20}$-alkyl, a branched $C_3$-$C_{20}$-alkyl and a $C_6$-$C_{20}$-aryl radical
and where the diphenols corresponding to formula (IVa) are present in an amount such that amount of diorganosiloxy units

present in said polycarbonate A) is from 1 to 25% by weight.

4. The molding composition of claim 1, characterized in that component A) is a mixture of siloxane-containing polycarbonates and siloxane-free polycarbonates.

5. The molding composition of claim 1, characterized in that said B) contains 15 to 60 parts by weight of B.1., a mixture of B.1.1) and B.1.2) and 40 to 85 parts by weight of B.2).

6. The molding composition of claim 1, characterized in that component D.1) is present in quantities of 0.1 to 1.0 parts by weight.

7. The molding composition of claim 1, characterized in that component D.1) is used as a co-precipitate of a coagulated mixture of an emulsion of tetrafluoroethylene polymer and an emulsion of said polymer B), in which the ratio by weight of said B) to said tetrafluoroethylene is from 95:5 to 60:40 and the amount of said co-precipitate based on 100 parts by weight of A) and B) is from 0.1 to 20.0 parts by weight.

8. The molding composition of claim 1, characterized in that component D.2) is present in quantities of from 0.2 to 3.0 parts by weight.

9. The molding composition of claim 1, characterized in that component D.2) is used as a co-precipitate of a coagulated mixture of an emulsion of said silicone resins D.2) with an emulsion of the graft polymers B), wherein the weight ratio of graft polymer B) to silicone resin D.2) is from 99.9:0.1 to 50:50 and the amount of co-precipitate, based on 100 parts by weight of A) and B) is from 0.1 to 30.0 parts by weight.

10. The molding composition of claim 1, further comprising at least one member selected from the group consisting of a thermoplastic polysulphone, thermoplastic polyether sulphone, thermoplastic polyketone, thermoplastic polyether ketone, thermoplastic polyphenylene ether, thermoplastic polyarylene sulphide, a stabilizer, a pigment, a fluidizing agent, an antistatic agent and another flame retardant.

11. The composition of claim 1 wherein said monovalent hydrocarbon group is substituted.

12. The composition of claim 1 wherein said Z independently denote alkyl radical.

* * * * *